No. 741,117. PATENTED OCT. 13, 1903.
A. R. DEMORY.
STEERING DEVICE FOR AUTOMOBILES.
APPLICATION FILED NOV. 1, 1902.
NO MODEL.
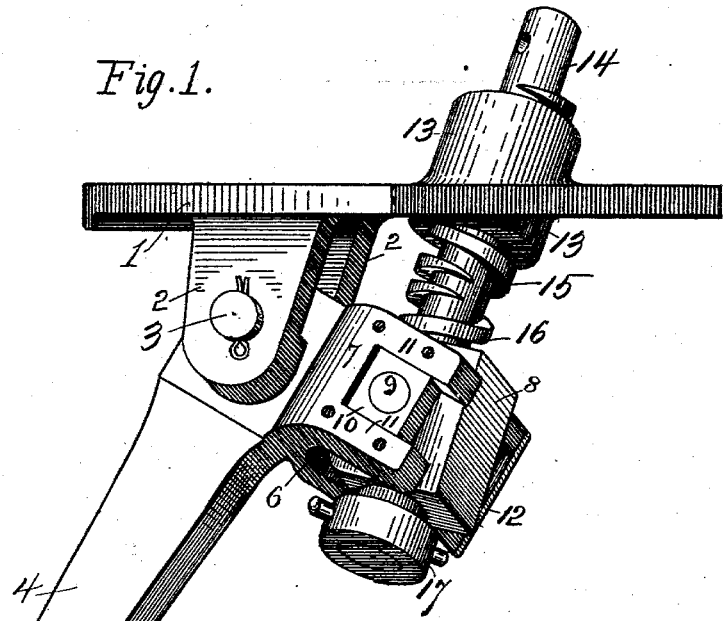

No. 741,117. Patented October 13, 1903.

UNITED STATES PATENT OFFICE.

ADAM R. DEMORY, OF TOLEDO, OHIO, ASSIGNOR TO KIRK MANUFACTURING CO., OF TOLEDO, OHIO.

STEERING DEVICE FOR AUTOMOBILES.

SPECIFICATION forming part of Letters Patent No. 741,117, dated October 13, 1903.

Application filed November 1, 1902. Serial No. 129,640. (No model.)

*To all whom it may concern:*

Be it known that I, ADAM R. DEMORY, a citizen of the United States, residing at Toledo, in the county of Lucas and State of Ohio, have invented certain new and useful Improvements in Steering Devices for Automobiles; and I do declare the following to be a full, clear, and exact description of the invention, such as will enable others skilled in the art to which it appertains to make and use the same, reference being had to the accompanying drawings, and to the figures of reference marked thereon, which form a part of this specification.

In steering automobiles, especially heavy machines, it is desirable that the steering-wheels be constantly held rigidly locked in any position to which they may be turned. This has been accomplished by means of a worm-gear on the lower end of the staff which carries the steering hand-wheel, and it has also been accomplished by means of a screw on the steering-staff engaged with a nut connected with the steering-rods which move the steering-wheels. These devices have served to hold the steering-wheels locked at all times in any position to which they might be turned; but they have proved objectionable, for the reason that the worm-gear and the screw-controlled gear referred to are too slow and do not permit the quick control of the steering-wheels requisite when the machine is in rapid motion.

My invention relates to and its object is to provide means for overcoming the difficulties and objections here pointed out, and more particularly to furnish a steering-gear for automobiles in which the steering apparatus shall at all times be locked against accidental deflection and which may be quickly and easily operated.

My invention also relates to certain details of construction hereinafter described, and pointed out in the claims.

I attain the objects above referred to by means of the devices and arrangement of parts hereinafter described, and shown and illustrated in the accompanying drawings, in which—

Figure 1 is a side view in perspective of my device, and Fig. 2 a like view of the swiveled nut hereinafter referred to.

In the drawings, 1 is a plate secured to the bottom side of the floor of the body of the automobile in front of the operator. Projecting downwardly from this plate is a pair of lugs 2, between which is fulcrumed on pin 3 a bell-crank lever 4. One end of this lever is formed as a ball, as at 5, and forms part of a ball-and-socket connection with a rod which is connected with and controls the direction of the guide-wheels of the vehicle. This connecting-rod and the manner of connecting it with the steering-wheels forms no part of my invention and will be fully understood without illustration. The opposite end of the bell-crank lever is bifurcated, as at 6, and between the arms 7 thus formed is a nut 8, having trunnions 9, journaled in blocks 10, which slide between parallel jaws 11 on the arm 7 of the bell-crank lever. The outer faces of the jaws, the sliding blocks, and the trunnions are covered with plates 12, one of these plates being shown in the drawings as removed to expose the parts.

On the top and bottom surfaces of the plate 1 are formed coincident inclined bosses 13, bored axially and screw-threaded. These two threaded bosses together constitute a fixed nut. The threads of the nut 8 and of the boss 13 are turned oppositely to each other—that is to say, one is a right-hand thread and the other is a left-hand thread.

14 is the lower end of a steering-staff, which carries at its upper end a hand-wheel in the usual form, but not illustrated in the drawings. The staff is in detachable sections, only the lower section of the staff being shown. This staff passes through the boss 13 and the nut 8 and is threaded, as at 15, to correspond with the thread of the fixed nut and is threaded, as at 16, to correspond with the nut 8. The bottom projecting end of the staff is provided with a removable collar 17, which forms a stop to limit the throw of the bell-crank lever.

The operation of my device is as follows: The parts being assembled as above described and illustrated in the drawings, now if the staff 14 be turned axially to the right or left the staff moves lengthwise, carrying with it the nut 8, which swings the bell-crank lever and through the intervening connections the steering-wheels. The turn of the staff 14 also causes the nut which is held against rotation by the bifurcated arms of the bell-crank lever to move along the staff, and thus the action of the right-hand and left-hand screws 15 and 16 gives to the extremity 5 of the bell-crank lever a motion twice as rapid as it would have if a single threaded screw were employed.

It will be seen that the block 10, sliding in the jaws 11, and the trunnion 9, journaled in the block 10, permits the nut 8 and the lever 4 to easily accommodate themselves to their changing positions relatively to the staff.

Having described my invention, what I claim, and desire to secure by Letters Patent, is—

1. In a steering device for automobiles, a lever, one arm of which is adapted to engage connections with the guide-wheels of the vehicle, a nut carried by and which reciprocates upon the other arm of the lever, a fixed nut having a thread opposed to the thread of the nut first mentioned, and a steering-staff having threads corresponding to and in engagement with the threads of said two nuts.

2. In a steering device for automobiles, a floor-plate, a bell-crank lever pivoted on said floor-plate, a nut carried by one arm of said lever, a nut formed integral with said plate, said two nuts being oppositely threaded, and a staff having threads corresponding to and in engagement with the threads of said two nuts.

3. In a steering device for automobiles, a lever, a nut supported upon one extremity of said lever, and adapted to oscillate and to slide thereon, a fixed nut having a thread opposed to the thread of the first-mentioned nut, and a staff having threads corresponding to and in engagement with the threads of said two nuts.

4. In a steering device for automobiles, a floor-plate, a bell-crank lever fulcrumed thereon, one end of said lever being bifurcated, parallel jaws on said bifurcated portion, blocks slidably mounted in said jaws, a nut in said bifurcation, pivotal connections between the nut and said blocks, a fixed nut on the plate, said two nuts being oppositely threaded, and a staff having oppositely-threaded portions in engagement with said two nuts.

In testimony whereof I affix my signature in presence of two witnesses.

ADAM R. DEMORY.

Witnesses:
R. F. SWIGART,
S. A. DORLAND.